US011724251B2

(12) United States Patent
Arulraj et al.

(10) Patent No.: US 11,724,251 B2
(45) Date of Patent: Aug. 15, 2023

(54) APPARATUS FOR COATING A FILTER SUBSTRATE

(71) Applicant: Johnson Matthey Public Limited Company, London (GB)

(72) Inventors: Kaneshalingham Arulraj, Royston (GB); Jenita Bhantoo, Royston (GB); Jamie Savage, Royston (GB); Andrew Smith, Royston (GB); Lifeng Wang, Sakura (JP); Daisuke Yokota, Royston (GB)

(73) Assignee: Johnson Matthev Public Limited Comoanv, London (GB)

( * ) Notice: Subject to any disclaimer, the term of this patent is extended or adjusted under 35 U.S.C. 154(b) by 386 days.

(21) Appl. No.: 16/948,663

(22) Filed: Sep. 28, 2020

(65) Prior Publication Data
US 2021/0008534 A1    Jan. 14, 2021

Related U.S. Application Data

(63) Continuation of application No. 15/509,752, filed as application No. PCT/GB2015/050858 on Mar. 24, 2015, now Pat. No. 10,814,318.

(30) Foreign Application Priority Data

Mar. 25, 2014    (GB) .................................... 1405277

(51) Int. Cl.
| | | |
|---|---|---|
| B01J 37/02 | (2006.01) | |
| B05D 7/22 | (2006.01) | |
| B01D 46/24 | (2006.01) | |
| B05D 3/04 | (2006.01) | |
| B01J 35/04 | (2006.01) | |
| F01N 3/035 | (2006.01) | |
| F01N 3/20 | (2006.01) | |

(52) U.S. Cl.
CPC ...... B01J 37/0217 (2013.01); B01D 46/2418 (2013.01); B01J 35/04 (2013.01); B01J 37/0215 (2013.01); B01J 37/0219 (2013.01); B05D 3/0493 (2013.01); B05D 7/22 (2013.01); F01N 3/035 (2013.01); F01N 3/208 (2013.01); F01N 3/2066 (2013.01); F01N 2510/06 (2013.01)

(58) Field of Classification Search
CPC .... B01J 37/02; B01J 37/0217; B01J 37/0215; B01J 37/0219; B01D 46/2418; B05D 3/0493; B05D 7/22; F01N 3/035; F01N 3/208; F01N 3/2066; F01N 2510/06
USPC .......................................................... 502/300
See application file for complete search history.

(56) References Cited

U.S. PATENT DOCUMENTS

| | | |
|---|---|---|
| 4,191,126 A | 3/1980 | Reed et al. |
| 6,627,257 B1 | 9/2003 | Foerster et al. |
| 7,323,054 B2 | 1/2008 | Aderhold et al. |
| 8,491,966 B2 | 7/2013 | Hasselmann |
| 9,636,693 B2 | 5/2017 | Nakano et al. |
| 10,814,318 B2 * | 10/2020 | Arulraj .................... B01J 35/04 |
| 2004/0001919 A1 | 1/2004 | Aderhold et al. |
| 2009/0130294 A1 | 5/2009 | Fehnle et al. |
| 2010/0093527 A1 | 4/2010 | Hasselmann |
| 2010/0304958 A1 | 12/2010 | Guo et al. |
| 2011/0268624 A1 | 11/2011 | Chandler et al. |
| 2011/0305610 A1 | 12/2011 | Lambert et al. |
| 2012/0021896 A1 | 1/2012 | Nakano et al. |
| 2016/0067720 A1 | 3/2016 | Nakano et al. |
| 2021/0008534 A1 | 1/2021 | Arulraj et al. |

FOREIGN PATENT DOCUMENTS

| | | |
|---|---|---|
| AU | 2011254008 A1 | 1/2012 |
| DE | 102006038406 A1 | 2/2008 |
| EP | 0980710 A1 | 2/2000 |
| EP | 3122458 A2 | 2/2017 |
| JP | 2000084417 A | 3/2000 |
| JP | 2000202304 A | 7/2000 |
| JP | 2002506720 A | 3/2002 |
| JP | 2008302304 A | 12/2008 |
| JP | 2010521305 A | 6/2010 |
| SU | 969420 A1 | 10/1982 |
| WO | 9947260 A1 | 9/1999 |
| WO | 2008019857 A1 | 2/2008 |
| WO | 2010114132 A1 | 10/2010 |
| WO | 2011080525 A1 | 7/2011 |

* cited by examiner

Primary Examiner — Edward M Johnson

(57) ABSTRACT

An apparatus of coating a filter substrate comprising a plurality of channels and an apparatus is disclosed. The apparatus comprises: (i) a containment means for receiving a pre-determined amount of the liquid; and (ii) a liquid dosing head arranged to dispense the pre-determined amount of the liquid into the containment means over an upper end of the filter substrate. The containment means is locatable at an upper end of the filter substrate; and the liquid dosing head comprises a plurality of apertures for dispensing the liquid onto the upper end of the filter substrate.

10 Claims, 1 Drawing Sheet

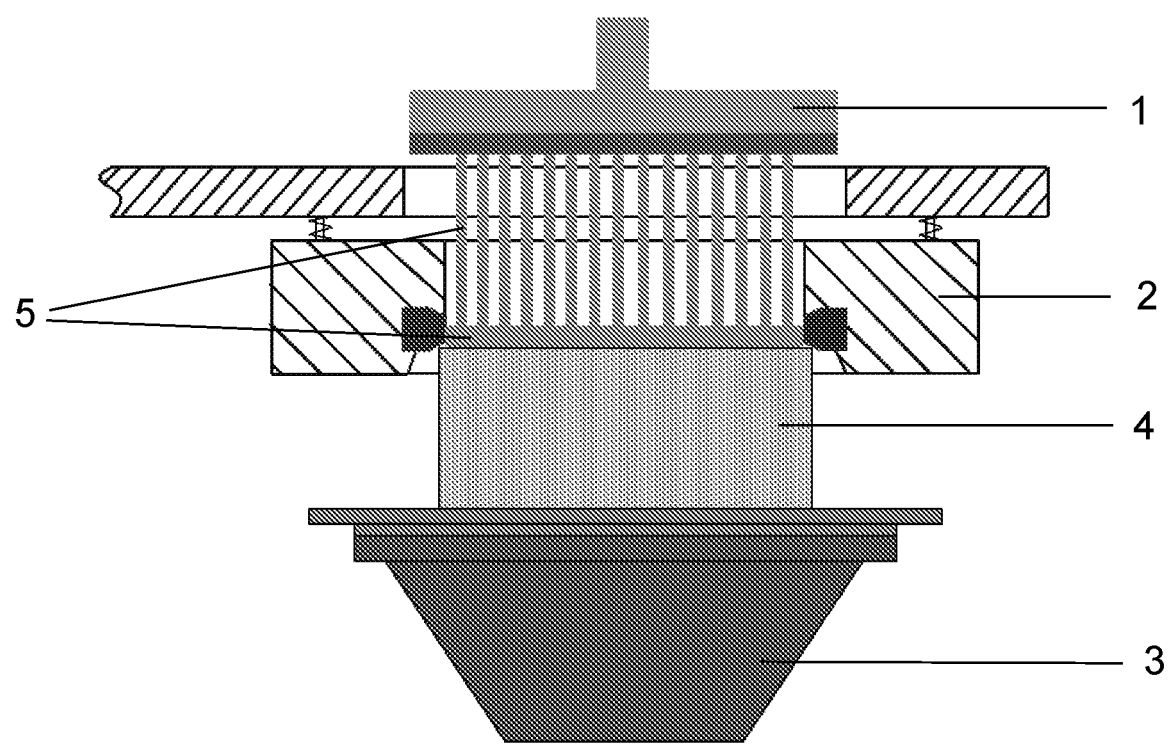

APPARATUS FOR COATING A FILTER SUBSTRATE

CROSS-REFERENCE TO RELATED APPLICATION

This application is a continuation of U.S. application Ser. No. 15/509,752, filed on Mar. 8, 2017, which is a 371 of PCT/GB2015/050858, filed on Mar. 24, 2015, which claims priority to GB Application No. 1405277.3, filed on Mar. 25, 2014, the entire contents of which are fully incorporated herein by reference.

FIELD OF THE INVENTION

The invention relates to an apparatus of coating a filter substrate.

BACKGROUND TO THE INVENTION

Large numbers of emissions control devices comprising coated filter substrates are manufactured each year. One of the principal uses of such devices is for the filtration of particulate matter (PM), such as soot, produced by an internal combustion engine, particularly a vehicular internal combustion engine. Emissions control devices comprising coated filter substrates are commonly used to remove PM produced by compression ignition engines, such as diesel engines. However, as environmental legislation is becoming increasingly more stringent, interest has also focussed on the removal of nanoparticles generated by gasoline engines.

One of the challenges in manufacturing coated filter substrates relates to the application of a uniform coating onto the walls of the channels of the filter substrate. This is because each channel of a filter substrate generally has only one open end (the other end being closed, usually by plugging), which is problematic for the application of a washcoat. It can be difficult to apply a washcoat to the channels of a filter substrate to obtain a desired coating depth, an even coating depth across all of the channels and a uniform washcoat distribution within each channel.

One method that shows good results for uniformly applying washcoat onto the walls of a filter substrate is described in WO 2011/080525. WO 2011/080525 describes a method of coating a honeycomb monolith substrate comprising a plurality of channels with a liquid comprising a catalyst component, which method comprising the steps of: (i) holding a honeycomb monolith substrate substantially vertically; (ii) introducing a pre-determined volume of the liquid into the substrate via open ends of the channels at a lower end of the substrate; (iii) sealingly retaining the introduced liquid within the substrate; (iv) inverting the substrate containing the retained liquid; and (v) applying a vacuum to open ends of the channels of the substrate at the inverted, lower end of the substrate to draw the liquid along the channels of the substrate.

However, the method described in WO 2011/080525 may be inconvenient for certain applications. This method may not allow the location of the washcoat coating on the substrate wall (e.g. on-wall or in-wall coating) to be easily controlled and it may be necessary to use a washcoat having a viscosity within a specific range.

WO 99/47260 describes a general method for coating a monolithic support. A method of coating a flow-through honeycomb substrate is exemplified in WO 99/47260. This method is typically used to apply a washcoat having a relatively high viscosity.

SUMMARY OF THE INVENTION

The inventors have developed a method and apparatus for automatedly and uniformly coating a filter substrate. In particular, the method allows the location of the washcoat coating on the channel walls of the filter substrate to be controlled and has short cycle times. The method also allows the amount of active material (e.g. in the washcoat) that is coated onto a filter substrate to be accurately controlled. This is important because the active material usually comprises a precious metal, which is expensive. It may also be possible using the method and apparatus of the invention for the washcoat formulation to be applied directly to a filter substrate without modifying its viscosity.

The invention generally relates to a method of coating a filter substrate comprising a plurality of channels, which method comprises the steps of:
(a) introducing a pre-determined amount of a liquid into a containment means at an upper end of the filter substrate; and
(b) coating the channels having open ends at the upper end of the filter substrate with the liquid, preferably the pre-determined amount of the liquid, from the containment means.

The location of the containment means at an upper end of the filter substrate means that the coating of the channels with the liquid is assisted by gravity. Step (b) may comprise coating the channels having open ends at the upper end of the filter substrate with the liquid from the containment means by allowing the liquid to enter and/or fill the channels under gravity.

Also provided by the invention is an apparatus for coating a filter substrate with a liquid, which apparatus comprises:
(i) a containment means for receiving a pre-determined amount of the liquid; and
(ii) a liquid dosing head arranged to dispense the pre-determined amount of the liquid into the containment means over an upper end of the filter substrate;
wherein the containment means is locatable at an upper end of the filter substrate, and the liquid dosing head comprises a plurality of apertures for dispensing the liquid onto the upper end of the filter substrate.

The walls of the channels of filter substrates comprise a porous material, which provides a barrier to particulate matter (PM) but allows gases to flow through. It is possible to apply the washcoat primarily to the surface of the walls of the channels (i.e. substantial or complete "on-wall" coating) and form a membrane type coating. Alternatively, most or all of the washcoat may be drawn or forced into the porous material in the channel walls (i.e. substantial or complete "in-wall" coating).

When preparing a filter substrate with an on-wall coating, it is to be understood that in many instances, even though the majority of the washcoat (e.g. >50% of the total mass of all catalyst components) may form an on-wall coating, some of the washcoat will enter the wall of the filter substrate and form an in-wall coating. Similarly, when preparing a filter substrate with an in-wall coating, some of the washcoat may remain as an on-wall coating, even though the majority of the washcoat forms an in-wall coating (e.g. ≥50% of the total mass of all catalyst components).

It is advantageous to be able to control the location of the washcoat on the channel walls because the washcoat location can affect the back pressure of the filter substrate that is generated in use. The components of an exhaust gas that are brought into contact with the washcoat and the chemical reactions that will be performed by the active constituents of the washcoat may also be influenced by its location on the filter substrate.

The invention may allow the filter substrate to be accurately coated to a desired coating depth (e.g. desired coating length along the length of the channels). The invention can also be used to coat the whole length of the channels or only a short length (e.g. face coating of the substrate). When a coating is applied to a part length of the channels from both ends of the substrate, then the length of a coating in one channel (e.g. an inlet channel) can overlap with a length of a coating in an adjacent channel (e.g. an outlet channel), the coatings being separated by a wall of the substrate. The invention may allow good control over the amount of overlap between coated ends.

The method of the invention is concerned with coating a filter substrate using a washcoat having a relatively low viscosity. Similar methods in the art generally require the use of a washcoat having a high viscosity to obtain a uniform coating depth. This is because a washcoat having a high viscosity can be distributed evenly over the upper end of the substrate before it is pulled into the small channel openings in the substrate by a vacuum. A disadvantage of using high viscosity washcoats in such methods is that it can be difficult to obtain a uniform coating depth for substrates having a large diameter.

It has surprisingly been found that a uniform coating depth can be obtained using a low viscosity washcoat when the substrate is a filter substrate, particularly when the substrate has a relatively large diameter. Low viscosity washcoats are advantageous because they are easier to process, require less time to prepare than high viscosity washcoats, reduce batch to batch variability in the properties of the washcoat, and remove or reduce the changes in washcoat properties on ageing.

There are several aspects of the invention. A first aspect of the invention includes a first method aspect and a first apparatus aspect.

A first method aspect of the invention relates to a method of coating a filter substrate comprising a plurality of channels, which method comprises the steps of:
(a) introducing a pre-determined amount of a liquid into a containment means at an upper end of the filter substrate; and
(b) applying a vacuum to a lower end of the filter substrate.

In the first method aspect of the invention, the general step of (b) coating the channels having open ends at the upper end of the filter substrate with the liquid from the containment means comprises, or is by, applying a vacuum to a lower end of the filter substrate.

Typically, in the first method aspect, step (b) is generally a step of (b) applying a vacuum to a lower end of the filter substrate to draw the liquid from the containment means along the channels having open ends at the upper end of the filter substrate (thereby coating the channels).

A first apparatus aspect of the invention relates to an apparatus for coating a filter substrate with a liquid, which apparatus comprises:
(i) a containment means for receiving a pre-determined amount of the liquid;
(ii) a liquid dosing head arranged to dispense the pre-determined amount of the liquid into the containment means over an upper end of the filter substrate; and
(iii) means for applying a vacuum to a lower end of the filter substrate;
wherein the containment means is locatable at an upper end of the filter substrate, and the liquid dosing head comprises a plurality of apertures for dispensing the liquid onto the upper end of the filter substrate.

The first aspect of the invention may be used for the in-wall coating of the channels of a filter substrate with the liquid. The step of applying the vacuum to a lower end of the filter substrate draws the liquid into the channel walls of the substrate, which are made of a porous material.

The invention also has a second aspect, which includes a second method aspect.

A second aspect of the invention provides a method of coating a filter substrate comprising a plurality of channels, which method comprises the steps of:
(a) introducing a pre-determined amount of a liquid into a containment means at an upper end of the filter substrate; and
(b) draining the liquid from the containment means into the filter substrate.

In the second method aspect of the invention, the general step of (b) coating the channels having open ends at the upper end of the filter substrate with the liquid from the containment means comprises, or is by, draining the liquid from the containment means into the filter substrate.

In the second method aspect, step (b) is generally a step of (b) draining the liquid from the containment means into the channels having open ends at the upper end of the filter substrate (thereby coating the channels).

The second aspect of the invention may be used for on-wall coating of the channels of a filter substrate with the liquid. The step of draining the liquid from the containment means into the filter substrate allows the liquid to form a coating (e.g. membrane type coating) on the surface of the channel walls of the substrate.

BRIEF DESCRIPTION OF THE DRAWINGS

FIGURE shows a cross-section of an apparatus in accordance with the invention. The apparatus may be used for performing a method of the invention. The apparatus comprises a shower head (1) that is used to deposit a washcoat (5) onto a filter substrate (4) into the space defined by wall (2) and the upper end face of the filter substrate (4). A vacuum may be applied to the lower end of the filter substrate using vacuum cone (3).

DETAILED DESCRIPTION OF THE INVENTION

The invention specifically concerns the coating of filter substrates with a liquid. A filter substrate has a different structure to a flow-through substrate.

A flow-through substrate generally comprises a plurality of channels, typically extending therethrough, wherein each channel is open at both ends (i.e. an open end at the inlet and an open end at the outlet). The channels are formed between a plurality of walls. The walls generally comprise a non-porous material.

By contrast, a filter substrate comprises a plurality of channels, wherein each channel has an open end and a closed end (e.g. a blocked or plugged end). Each channel is typically separated from an adjacent or neighbouring channel by a wall. The wall comprises, or consists essentially of, a porous material. Such porous materials are well known in the art.

In general, a filter substrate comprises a plurality of inlet channels and a plurality of outlet channels. Each inlet channel has an open end at a first end of the substrate and a closed (e.g. blocked or plugged) end at a second end of the substrate (i.e. the second end is the opposite end to the first end), and each outlet channel has a closed (e.g. blocked or plugged) end at the first end of the substrate and an open end at the second end of the substrate.

In a filter substrate, each channel having an open end at a first end of the substrate and a closed end at a second (i.e. opposite) end of the substrate is typically adjacent to a channel having a closed end at the first end of the substrate and an open end at the second (i.e. opposite) end of the substrate. Fluid communication between the channels is via a wall (e.g. through the porous material) of the substrate.

The wall typically has a thickness of 0.002 to 0.1 inches (0.05 to 2.54 mm), such as 0.005 to 0.050 inches (0.12 to 1.27 mm), particularly 0.010 to 0.025 inches (0.25 to 0.64 mm).

Typically, the channels of a filter substrate have alternately closed (e.g. blocked or plugged) and open ends. Thus, each inlet channel may be adjacent to an outlet channel, and each outlet channel may be adjacent to an inlet channel. When viewed from either end of the filter substrate, the channels may have the appearance of a chessboard.

However, the filter substrate may have an inlet channel (i.e. a "first" inlet channel) that is adjacent to another inlet channel (i.e. a "second" inlet channel) and optionally to an outlet channel, such as the "first" outlet channel and/or the "second" outlet channel. The filter substrate may have an outlet channel (i.e. a "first" outlet channel) that is adjacent to another outlet channel (i.e. a "second "outlet" channel) and optionally to an inlet channel, such as the "first" inlet channel and/or the "second" inlet channel.

The filter substrate may have from 100 to 700 cells (or "channels") per square inch ("cpsi"), particularly 250 to 400 cpsi.

The liquid may be a solution or a suspension. The suspension may be a colloidal suspension, such as a sol, or a non-colloidal suspension. When the liquid is a solution or a suspension, then it may be an aqueous solution or an aqueous suspension. Typically, the liquid is a suspension, particularly an aqueous suspension.

The term "liquid" as used herein is synonymous with the term "washcoat".

Typically, the liquid comprises a catalyst component. The expression "catalyst component" encompasses any component that may be included in a washcoat formulation that contributes to the activity of the resulting emissions control device, such as a platinum group metal (PGM), a support material (e.g. refractory oxide) or a zeolite. It is to be understood that the term "catalyst component" does not require that the component itself has catalytic activity in the strict sense of the meaning of the term "catalyst" (e.g. increasing the rate of reaction). For example, the catalyst component can refer to a material that is able to store or absorb $NO_x$ or a hydrocarbon. Liquids comprising a catalyst component are known to those skilled in the art. The catalyst component(s) included in the liquid will depend on the product that is to be manufactured.

The coated filter substrate or product obtained by a method of the invention or using an apparatus of the invention may, for example, be a filter substrate comprising an oxidation catalyst (e.g. a catalysed soot filter [CSF]), a selective catalytic reduction (SCR) catalyst (e.g. the product may then be called a selective catalytic reduction filter [SCRF™] catalyst), a $NO_x$ adsorber composition (e.g. the product may then be called a lean $NO_x$ trap filter [LNTF]), a three-way catalyst composition (e.g. the product may then be called a gasoline particulate filter [GPF]), an ammonia slip catalyst [ASC] or a combination of two or more thereof (e.g. a filter substrate comprising a selective catalytic reduction (SCR) catalyst and an ammonia slip catalyst [ASC]).

In addition to the "catalyst component", the liquid may further comprise a formulation aid. The term "formulation aid" refers to a component that is included in the liquid to modify its chemical or physical properties for coating onto a filter substrate. The formulation aid may, for example, aid the dispersion of a catalytic component in the liquid or change the viscosity of the liquid. The formulation aid may not be present in the final coated filter substrate product (e.g. it may decompose or degrade during calcination). The formulation aid may, for example, be an acid, a base, a thickener (e.g. organic compound thickener) or a binder.

It is to be understood that the type of coating (e.g. on-wall or in-wall) that is obtained will depend on a variety of factors, such as the viscosity of the liquid, the porosity of the filter substrate (i.e. the porosity of the porous material that forms the walls of the filter substrate) and the particle size distribution of solids dispersed in the liquid. The process conditions also affect the type of coating that is obtained. However, in general, the first aspect of the invention is able to provide substantial in-wall coating of a filter substrate and the second aspect of the invention is able to provide substantial on-wall coating of a filter substrate.

Using the invention it has been possible to successfully coat filter substrates with liquids (e.g. washcoats) having relatively low viscosities.

Typically, the liquid may have a viscosity of ≤600 cP (as measured at 20° C. on a Brookfield RV DVII+ Extra Pro viscometer using a SC4-27 spindle at 50 rpm spindle speed).

Generally, the liquid has a viscosity from 5 cP to 600 cP, such as 10 cP to 600 cP (as measured at 20° C. on a Brookfield RV DVII+ Extra Pro viscometer using a SC4-27 spindle at 50 rpm spindle speed). Thus, the liquid may have a viscosity of 10 to 500 cP, such as 15 to 250 cP (e.g. 50 to 200 cP), and preferably 20 to 50 cP.

For example, the liquid may have a viscosity of 500 cP (at a shear rate of 20 $s^{-1}$ [as measured at 20° C. on a Brookfield LV DVII+ Pro viscometer using a SC4-27 spindle]). The liquid may have a viscosity of 10 to 500 cP, preferably 25 to 400 cP, and more preferably 50 to 200 cP.

The liquid may have a viscosity of 80 cP (at a shear rate of 66 $s^{-1}$ [as measured at 20° C. on a Brookfield LV DVII+ Pro viscometer using a SC4-27 spindle]).

It may be preferable, particularly in the second aspect of the invention, that the liquid has a viscosity from 5 to 100 cP, such as 10 to 100 cP, particularly 20 to 90 cP, preferably 25 to 80 cP, and even more preferably 35 to 65 cP (as measured at 20° C. on a Brookfield RV DVII+ Extra Pro viscometer using a SC4-27 spindle at 50 rpm spindle speed).

The liquid used in the first aspect of the invention may have a higher viscosity than the liquid used in the second aspect of the invention.

The liquid in the second aspect has a viscosity that allows the liquid to gradually drain under gravity into the filter substrate.

Generally, the liquid, particularly in the second aspect of the invention, may not comprise a thickener. In many instances, it is not necessary to modify the viscosity of the liquid for use in the second aspect of the invention.

In general, the invention involves introducing a predetermined amount of a liquid into a containment means at an upper end of the filter substrate. The upper end of the filter substrate is preferably an upper end face of the filter substrate.

The pre-determined amount may be a pre-determined volume and/or a pre-determined mass of the liquid. It is preferred that the pre-determined amount is a pre-determined volume.

Typically, the pre-determined amount is a single dose of the liquid.

Step (a) of the method of the invention may, in general, be a step of (a) introducing a pre-determined amount of a liquid into a containment means at an upper end of the filter substrate using a liquid dosing head. Typically, the liquid dosing head is arranged to dispense the pre-determined amount of the liquid into the containment means onto the upper end of the filter substrate.

It is preferred that step (a) is a step of (a) depositing a pre-determined amount of a liquid into a containment means at an upper end of the filter substrate, more preferably using a liquid dosing head.

Generally, the liquid dosing head comprises a plurality of apertures for dispensing, preferably depositing, the liquid onto the upper end of the filter substrate. The plurality of apertures are preferably arranged to dispense or deposit the liquid onto the upper end face of the filter substrate. More preferably, the plurality of apertures are arranged to deposit the liquid evenly onto the upper end face of the filter substrate.

The liquid dosing head may be a shower head. The shower head, particularly for the second aspect of the invention, should be able to distribute the liquid evenly onto the upper end face of the filter substrate without dripping (e.g. when the liquid has a low viscosity) or without blocking (e.g. when the liquid has a high viscosity).

When the liquid dosing head or shower head comprises a plurality of apertures arranged to deposit the liquid evenly onto the upper end face of the filter substrate, then preferably the plurality of apertures is a plurality of circular apertures, more preferably the plurality of circular apertures have the same diameter (e.g. all of the circular apertures have the same diameter). It may be unnecessary to use a liquid dosing head having apertures with several different diameters (as may be used with high viscosity washcoats) to obtain a uniform coating depth.

In general, the plurality of apertures for depositing the liquid evenly onto the upper end face of the filter substrate may be the only apertures in the liquid dosing head or shower head for depositing the liquid onto the upper end face of the filter.

Typically, the liquid dosing head is coupled to a liquid dispenser. The liquid dispenser may be engineered using generally known principles. For example, there are commercially available machines capable of highly accurate dosing by volume or weight of liquids, for example used for filling in the food or paint industry. These machines are capable of handling liquids of many different viscosities and rheologies.

The liquid dispenser is able to dispense a pre-determined amount of the liquid, preferably from a vessel (e.g. a vessel for containing a bulk quantity or large volume of the liquid). The vessel may be stirred and will be replenished from time to time. Since the apparatus provides accurately measured amounts and no recycling of the liquid takes place, the quality and composition of the liquid remains constant, and losses are reduced.

A feature of the invention relates to the introduction of a pre-determined amount of the liquid into a containment means at an upper end of the filter substrate. The containment means is generally locatable at an upper end of the filter substrate (i.e. the filter substrate to be coated), preferably at an upper end face of the filter substrate.

The containment means is for containing and/or locating the liquid on an upper end of the filter substrate, preferably an upper end face of the filter substrate. The containment means is for containing and/or locating the liquid over either the entire upper end face of the filter substrate or part of the upper end face of the filter substrate.

Typically, the containment means is for containing and/or locating the liquid over substantially all or the entire upper end face of the filter substrate. The expression "substantially all" in this context refers to at least 95% of the surface area of the upper end face of the filter substrate, preferably at least 99% of the surface are of the upper end face of the filter substrate.

When the containment means is for containing and/or locating the liquid over part of the upper end face of the filter substrate, then the containment means may comprise a template for covering an area or areas of the upper end face of the filter substrate. The template is for preventing the liquid from flowing onto an area or areas of the upper end face of the filter substrate and to thereby prevent the liquid from entering any channels having open ends in the area or areas. The template is shaped to cover or blank off an area or areas of the upper end face of the filter substrate. This allows the manufacture of filter substrates where, for example, a circumferential portion of the channels are not coated with the liquid or filter substrates having portions coated with washcoats of a different composition and/or different concentration of components.

The template may be locatable on an upper end face of the filter substrate. The template is preferably contactable with an upper end face of the filter substrate.

The containment means typically comprises a housing for receiving an upper end of the filter substrate. Not all filter substrates have a conventional circular cross-section, and some may have an oval or "race-track", skewed oval or other asymmetric cross-section. Whatever the cross-section of the filter substrate, it is possible to adopt a suitably shaped housing for receiving the filter substrate using conventional methods or techniques.

Typically, the containment means or the housing thereof comprises a wall or a plurality of walls. The wall or walls is/are contactable with, or arranged to contact, an upper end of the filter substrate, preferably an upper end face of the filter substrate, more preferably a circumferential edge of an upper end face of the filter substrate. The wall or walls provide a barrier that prevents the liquid from flowing from the upper end face of the filter substrate and onto an exterior side surface of the filter substrate.

The wall or walls may generally correspond to (e.g. conform to or be conformable with) the cross-sectional shape of the filter substrate in the axial plane (i.e. the transverse plane, as viewed from an end face of the filter substrate).

The wall may be manufactured from conventional materials. For example, the wall may comprise a plastic (e.g. polypropylene or PTFE), a metal (e.g. stainless steel or PTFE-coated stainless steel), or a ceramic. Combinations of different materials may be used.

It is preferred that the containment means comprises a sealing means. The sealing means is for preventing the liquid from flowing from the upper end face of the filter substrate and onto an exterior side surface of the filter substrate, such as when a vacuum is applied. The housing of the containment means or the wall or walls may comprise the sealing means.

The sealing means may comprise, or consist of, a deformable, permeable base or at least one inflatable collar. It is preferred that the sealing means comprises at least one inflatable collar.

The or each inflatable collar is typically contactable (i.e. arranged to contact) and/or engageable (i.e. arranged to engage) with an exterior surface of the substrate, preferably an exterior surface at the upper end of the substrate.

The or each inflatable collar may be arranged to contact and/or engage with the exterior surface of the filter substrate in a horizontal plane (i.e. the axial plane). The inflatable collar or inflatable collars may be arranged to contact and/or engage with part of or to completely surround the exterior surface of the filter substrate in the horizontal plane (e.g. an exterior surface of a side of the substrate). For example, when the filter substrate has a circular cross-section (e.g. in the axial plane), then the inflatable collar or inflatable collars may be arranged to contact and/or engage with an arcuate portion or an entire circumference of the exterior surface of the filter substrate in the horizontal plane. It is preferred that the inflatable collar or inflatable collars is/are arranged to contact and/or engage with an entire circumferential length of an exterior surface of the filter substrate.

Typically, the or each inflatable collar is conformable with an exterior surface of the substrate. The or each inflatable collar may form a liquid or air tight seal around the filter substrate. The inflatable collar allows the apparatus to cater for variations in filter substrate diameter or circumference. If all the channels having an open end at the upper end of the filter substrate are to be coated, it may not be possible to make a seal with an upper end face of the filter substrate. Accordingly a suitable seal can be provided against an exterior side at an upper end of the filter substrate to allow the liquid to be dispensed onto the entire upper end face of the filter substrate.

It is preferred that the sealing means comprises only one inflatable collar or at least two inflatable collars (more preferably only two inflatable collars), wherein each inflatable collar is for contacting and/or engaging with an exterior surface of the substrate, more preferably an exterior surface at the upper end of the substrate.

The or each inflatable collar may be supported by the housing (e.g. supported by an internal wall of the housing) and, preferably, extends into an interior space of the housing.

The containment means may comprise a permeable base to form a container or receptacle for the liquid. The permeable base may adjoin the wall or walls of the containment means. The permeable base allows the liquid to be transferred onto an upper end face of the filter substrate. The permeable base or part thereof may be moveable in the manner of a guillotine, iris or shutter. The permeable base may be a perforated metal plate, a porous metal plate, a sintered metal sponge, a woven fabric, a non-woven fabric or a synthetic open cell foam.

In general, step (a) of the method of the invention may comprise the steps of (a1) locating a containment means at an upper end of a filter substrate, and then (a2) introducing a pre-determined amount of a liquid into the containment means (i.e. at the upper end of the filter substrate). Step (a) of the method preferably comprises the steps of (a0) holding a filter substrate vertically, more preferably holding a filter substrate vertically at a lower end of the filter substrate, (a1) locating a containment means at an upper end of a filter substrate, and then (a2) introducing a pre-determined amount of a liquid into the containment means (i.e. at the upper end of the filter substrate).

The apparatus of the invention may further comprise a means for holding the substrate or a substrate holder.

An advantage of the invention is that substantially all of the liquid is retained within the filter substrate. This may ensure that there is no significant excess of liquid that requires recycling and an even distribution may be obtained in the desired coating arrangement or pattern. A particular advantage of the invention is that usage of expensive components of the washcoat (e.g. precious metals) can be very well controlled, and it is not so necessary to over-specify loadings of those components in order to cope with process variations.

Typically, step (b) of the method comprises coating the channels having open ends at the upper end of the filter substrate with the liquid from the containment means and retaining substantially all of the liquid within the filter substrate. It is preferred that step (b) comprises coating the channels having open ends at the upper end of the filter substrate with the liquid from the containment means and retaining substantially all of the liquid within the filter substrate without recycling the liquid. The expression "substantially all" in this context refers to at least 99% of the predetermined amount of the liquid, preferably at least 99.5% of the predetermined amount, and more preferably all (i.e. 100%) of the pre-determined amount of the liquid.

In general, the method of the invention may comprise the step of (c) drying the filter substrate, preferably to dry the liquid onto the filter substrate, more preferably without inverting the filter substrate.

Step (c) may comprise (c1) drying the filter substrate, preferably to dry the liquid onto the filter substrate, more preferably without inverting the filter substrate, and then (c2) calcining the filter substrate, preferably without inverting the filter substrate.

Step (c) or steps (c1) and (c2) follow step (b). The filter substrate may be dried at 100 to 200° C. (e.g. for 5 to 60 minutes, particularly for 10 to 30 minutes). The drying step may be performed to fix the liquid onto the substrate.

The method of the first aspect of the invention involves (b) applying a vacuum to a lower end of the filter substrate. The apparatus of the first aspect of the invention comprises a means for applying a vacuum to a lower end of the filter substrate. In the method of the first aspect, step (b) may comprise (b) applying a vacuum to a lower end of the filter substrate using the means for applying a vacuum.

In general, step (b) of the first aspect comprises the step of (b) applying a vacuum to open ends of the channels at a lower end of the filter substrate. Thus, step (b) comprises the step of (b) applying a vacuum to open ends of the channels at a lower end of the filter substrate to coat the channels having open ends at the upper end of the filter substrate with the liquid from the containment means.

Step (b) may comprise the step of (b) continuously applying a vacuum to a lower end of the filter substrate, preferably until the containment means is substantially empty. The expression "substantially empty" in this context refers to a containment means containing less than 1% of the predetermined amount of the liquid, preferably less than 0.5% of the predetermined amount of the pre-determined amount of the liquid.

The vacuum is for drawing substantially all of the liquid into the filter substrate. The expression "substantially all" in this context refers to at least 99% of the predetermined amount of the liquid, preferably at least 99.5% of the predetermined amount, and more preferably all (i.e. 100%) of the pre-determined amount of the liquid. In addition to drawing substantially all of the liquid into the filter substrate, the vacuum typically ensures that the liquid.

Generally, the vacuum is from −0.5 to −50 kPa (below atmospheric pressure), particularly from −1 to −30 kPa, and preferably −5 to −20 kPa (e.g. the vacuum applied to the filter substrate).

The vacuum may be continuously applied for 0.25 to 15 seconds, such as 0.5 to 10 seconds, preferably 1 to 7.5 seconds (e.g. 2 to 5 seconds).

In general, high vacuum strengths and/or longer vacuum durations result in a larger proportion of in-wall coating.

The method of the first aspect may comprise the step of (b1) forming a sealing engagement between a lower end of the filter substrate and a means for applying a vacuum, and then (b2) applying a vacuum to the lower end of the filter substrate using the means for applying a vacuum.

The means for applying a vacuum typically comprises a funnel, such as a flow cone. The funnel or flow cone generally has an end for receiving a lower end of the filter substrate.

The means for applying a vacuum may further comprise a seal for forming a sealing engagement with the lower end of the substrate. The seal may be located at an end (e.g. wider end) of the funnel or flow cone.

Typically, the means for applying a vacuum comprises a vacuum generator, such as a vacuum pump. The vacuum generator can be connected to the funnel or flow cone by a conduit.

In the method of the first aspect, step (a) may comprise the step of (a3) retaining the liquid in the containment means, particularly retaining the pre-determined amount of the liquid in the containment means, for a rest period. The rest period is the period of time that starts when the pre-determined amount of the liquid has been introduced (i.e. completely introduced) into the containment means and finishes when a vacuum is applied to a lower end of the filter substrate.

The rest period may be at least 0.25 seconds, preferably at least 0.5 seconds, such as at least 1 second. In general, the rest period is no greater than 5 seconds, such as no greater than 3.5 seconds, and preferably no greater than 2 seconds. Longer liquid levelling time periods increase the overall time taken to coat a filter substrate (i.e. the cycle time), which is undesirable for the industrial scale manufacture of such products.

Generally, step (a3) precedes step (b) or step (b2) of the method. When the method comprises steps (a0), (a1) or (a2), then step (a3) follows step (a2). When the method comprises step (b1), then step (a3) may occur before, after or concurrently with step (b1). It is preferred that step (a3) follows step (b1).

The method of the second aspect of the invention involves (b) draining the liquid from the containment means into the filter substrate. In general, step (b) comprises the step of (b) draining the liquid under gravity (i.e. only under gravity) from the containment means under gravity into the filter substrate.

It is preferred that step (b) comprises the step of (b) draining the liquid from the containment means into the filter substrate without applying a vacuum (e.g. to a lower end of the filter substrate, such as open ends of the channels at a lower end of the filter substrate). More preferably, step (b) comprises the step of (b) draining the liquid from the containment means into the filter substrate without applying a vacuum and without applying pressure to the upper end of the filter substrate. Pressure could, for example, be applied by blowing a gas (e.g. air) onto the liquid in the containment means or by mechanically applying pressure to the liquid in the containment means.

Advantageously, the first aspect of the invention can be used to prepare a coated filter substrate having an in-wall coating, whereas the second aspect of the invention can be used to prepare a coated filter substrate having an on-wall coating. It is to be understood that the reference to an in-wall coating means that most of the coating is present in the wall instead of on a surface of the wall. Similarly, it is to be understood that the reference to an on-wall coating means that most of the coating is on a surface of the wall (e.g. as a membrane) instead of inside the wall itself, such as within the pores of the wall.

In the second aspect of the invention, the coating depth of the liquid is determined by the pre-determined amount of the liquid that is used. The liquid should be allowed to drain into the filter substrate for a sufficient time to allow complete diffusion to occur, such that the desired coating depth is obtained.

In the first or second aspects of the invention, the filter substrate may have a porosity of 40 to 75%, such as 45 to 70% (e.g. 45 to 65%) or 50 to 60%. The mean pore size may be determined using mercury porosimetry according to conventional methods. Highly porous substrates can be prone to breakage during coating processes. In comparison to methods in the prior art, the methods of the invention minimise substrate breakages because there is minimal manipulation of the substrate during the method.

In the first or second aspects of the invention, particularly the first aspect of the invention, the filter substrate has, or the walls of the filter substrate have, a mean pore size of 10 to 25 μm, such as 12 to 20 μm.

The filter substrate may have a pore size distribution of from 0.35 to 0.60, such as to 0.40 to 0.55 [e.g. where the pore size distribution is represented by $(d_{50}-d_{10})/d_{50}$]. When a filter substrate has a narrow pore size distribution, it is difficult to obtain both (i) a uniform distribution of the washcoat along the lengths of the channels of the substrate and (ii) a uniform coating profile through a cross-section of the substrate. This is thought to be due to the strong capillary forces that draw the washcoat into the channel walls before the washcoat can pass along the length of the channel. An advantage of the invention is that coated substrates having both (i) and (ii) can be manufactured when a substrate having a narrow pore size distribution is used.

It may be preferable (in the first or second aspects of the invention) that the filter substrate has a diameter (e.g. when having a circular cross-section) greater than or equal to 8 inches. If the filter substrate has an elliptical cross section, then preferably the filter substrate has an elliptical cross sectional area greater than or equal to 50.27 square inches.

The liquid for use in the first or second aspects of the invention is preferably a catalytic washcoat. The catalytic washcoat is preferably a hydrocarbon trap composition, a three-way catalyst (TWC) composition, a $NO_x$ absorber composition, an oxidation catalyst composition, a selective catalytic reduction (SCR) catalyst composition, a lean NOx catalyst composition or an ammonia slip catalyst (ASC) composition. Such catalytic washcoat compositions are well known in the art.

In the first or second aspects of the invention, the liquid may comprise particles (e.g. particles of a support material), wherein at least 90% of the particles have a particle size (i.e. a primary particle size) greater than 0.4 μm. Preferably, at least 90% of the particles have a particle size greater than 0.5 µm, more preferably greater than 1 µm, and even more preferably greater than 2 µm.

In the first or second aspects of the invention, the liquid may comprise particles (e.g. particles of a support material), wherein at least 90% of the particles have a particle size (i.e. a primary particle size) less than 25 µm. Preferably, at least 90% of the particles have a particle size less than 20 µm, more preferably less than 15 µm, and even more preferably less than 10 µm.

In the first aspect of the invention, the liquid is preferably a three way catalyst (TWC) composition.

In the second aspect of the invention, the liquid is preferably an oxidation catalyst composition or an SCR catalyst composition, more preferably the liquid is an SCR catalyst composition.

In general, the liquid may comprise a thickener. The thickener may be included to provide the liquid with a viscosity to either allow it to gradually drain into the filter substrate or so that it will sit on top of the filter substrate until a vacuum is applied to draw it into the substrate.

The invention may be used to coat an upper end face of the filter substrate. When coating an upper end face of the filter substrate, step (b) generally comprises coating the channels having open ends at the upper end of the filter substrate with the liquid from the containment means to a depth of 10% or less, preferably 5% or less (e.g. 2.5% or less) of the axial length of the filter substrate.

The filter substrate used in the invention (e.g. the first or second aspects of the invention) may have been pre-coated with a first liquid, such as from an upper end or lower end, preferably the lower end, of the filter substrate. The lower end in this context refers to the opposite end of the substrate (i.e. the upper end) that is to be coated according to the invention.

Thus, the method may relate to a method of coating a pre-coated filter substrate comprising a plurality of channels, wherein the pre-coated filter substrate has been coated with a first liquid from an upper end or a lower end (preferably the lower end) of a filter substrate, which method comprises the steps of:
(a) introducing a pre-determined amount of a second liquid into a containment means at the/an upper end of the pre-coated filter substrate; and
(b) coating the channels having open ends at the upper end of the pre-coated filter substrate with the second liquid from the containment means.

The pre-coated filter substrate may have a plurality of channels each with an on-wall coating and/or an in-wall coating.

In principle, any method could be used to prepare a pre-coated filter substrate. It is preferred that a method of the invention or the apparatus of the invention is used to prepare the pre-coated filter substrate.

When the filter substrate has been coated in accordance with the invention, then it may be coated from the opposite end, such as by coating using a method of the invention. The invention therefore relates to methods of coating a filter substrate from each end (i.e. the first end and the second end).

Thus, after step (c) of the method (for both the first and second method aspects), a second coating may be applied to the opposite end of the substrate. The method used to apply the second coating may be the same or different to that used to apply the first coating.

The first aspect of the invention further provides a method of coating a filter substrate comprising a plurality of channels, which method comprises the steps of:
(a) introducing a pre-determined amount of a first liquid into a containment means at an upper end of the filter substrate;
(b) applying a vacuum to a lower end of the filter substrate;
(c) drying the filter substrate;
(d) inverting the filter substrate (e.g. containing the first liquid);
(e) introducing a pre-determined amount of a second liquid into a containment means at an inverted, lower end of the filter substrate;
(f) applying a vacuum to the inverted, upper end of the filter substrate.

The reference to the inverted, lower end of the substrate refers to the upper end of the substrate after it has been inverted. Similarly, the reference to the inverted, upper end of the substrate refers to the lower end of the substrate after it has been inverted.

Step (e) corresponds to step (a) of the first aspect of the invention or as generally defined above. Step (f) corresponds to step (b) of the first aspect of the invention or as generally defined above.

The first aspect of the invention also provides a method of coating a filter substrate comprising a plurality of channels, which method comprises the steps of:
(a) introducing a pre-determined amount of a first liquid into a containment means at an upper end of the filter substrate;
(b) applying a vacuum to a lower end of the filter substrate;
(c) drying the filter substrate;
(d) inverting the filter substrate (e.g. containing the first liquid);
(e) introducing a pre-determined amount of a second liquid into a containment means at an inverted, lower end of the filter substrate;
(f) draining the second liquid from the containment means into the filter substrate.

Step (e) corresponds to step (a) of the second aspect of the invention or as generally defined above. Step (f) corresponds to step (b) of the second aspect of the invention or as generally defined above.

The second aspect of the invention also relates to a method of coating a filter substrate comprising a plurality of channels, which method comprises the steps of:
(a) introducing a pre-determined amount of a first liquid into a containment means at an upper end of the filter substrate; and
(b) draining the first liquid from the containment means into the filter substrate;
(c) drying the filter substrate;
(d) inverting the filter substrate (e.g. containing the first liquid);
(e) introducing a pre-determined amount of a second liquid into a containment means at an inverted, lower end of the filter substrate; and
(b) draining the second liquid from the containment means into the filter substrate.

Step (e) corresponds to step (a) of the second aspect of the invention or as generally defined above. Step (f) corresponds to step (b) of the second aspect of the invention or as generally defined above.

The second aspect of the invention further provides a method of coating a filter substrate comprising a plurality of channels, which method comprises the steps of:
(a) introducing a pre-determined amount of a first liquid into a containment means at an upper end of the filter substrate; and
(b) draining the first liquid from the containment means into the filter substrate;
(c) drying the filter substrate;
(d) inverting the filter substrate (e.g. containing the first liquid);
(e) introducing a pre-determined amount of a second liquid into a containment means at an inverted, lower end of the filter substrate;
(f) applying a vacuum to the inverted, upper end of the filter substrate.

Step (e) corresponds to step (a) of the first aspect of the invention or as generally defined above. Step (f) corresponds to step (b) of the first aspect of the invention or as generally defined above.

In general, the step of inverting the filter substrate is a step of rotating the substrate through 180°. After inverting the substrate, the open ends of the channels that were originally at a lower end of the substrate will be at an upper end of the substrate. The second liquid will be introduced into the open ends of the channels that were at a lower end of the substrate prior to inversion.

The first liquid and the second liquid may be the same (i.e. have the same composition) or may be different (i.e. have a different composition).

In the methods of the invention above, step (c) may comprise drying the filter substrate to form a pre-coated filter substrate. It is preferred that step (c) comprises drying the filter substrate to dry the liquid onto the filter substrate and form a pre-coated filter substrate.

Step (c) may comprise (c1) drying the filter substrate, preferably to dry the liquid onto the filter substrate, and then (c2) calcining the filter substrate to form a pre-coated filter substrate.

The apparatus of the invention may or may not comprise means for inverting the substrate (e.g. means for inverting the filter substrate containing the first liquid).

Definitions

The term "pre-determined amount" as used herein refers to a total amount of the liquid for introduction into the substrate that is sufficient to obtain a specific product characteristic, such as a desired coating specification. The amount is "pre-determined" in the sense that it is "pre-measured". Routine experiments may be performed off-line to find out the total amount of the liquid that is needed to achieve the desired product characteristics. Such pre-determined amounts can readily be determined and may be known from using other methods or apparatus for coating substrates in the art (e.g. see WO 99/47260 and WO 2011/080525).

The term "single dose" as used herein refers to an amount of the liquid for coating a single substrate, typically to meet a desired product specification.

Any reference to a "vacuum" as used herein refers to a pressure that is below atmospheric pressure. The term "vacuum" is not to be interpreted in its literal sense of a space that is completely devoid of matter. The strength of the vacuum that is applied to the substrate will depend on the composition of the liquid and the type of substrate that is being used. The vacuum should be strong enough to clear the cells of the substrate so that there are no blockages. Such vacuum strengths or reduced pressures are well known in the art.

Any reference to "substrate" as used herein, whether a "filter substrate" or a "through-flow substrate" embraces a substrate monolith (e.g. filter substrate monolith or through-flow substrate monolith).

Any reference to "substantial on-wall" as used herein with reference to coating refers to a filter substrate where a liquid comprising a catalyst component has been coated onto a surface of the wall (i.e. of the filter substrate), such that >50% of the catalyst component is disposed on a surface of the wall, particularly >60% of the catalyst component, preferably >70% of the catalyst component (e.g. >80% of the catalyst component), and more preferably >90% of the catalyst component. When the liquid comprise a plurality of catalyst components, then typically >50% of all of the catalyst components are disposed on a surface of the wall, particularly >60% of all of the catalyst components, preferably >70% of all of the catalyst components (e.g. >80% of all of the catalyst components), and more preferably >90% of all of the catalyst components.

Any reference to "substantial in-wall" as used herein with reference to coating refers to a filter substrate where a liquid comprising a catalyst component resides within the wall (e.g. the porous material/structure of the wall of the filter substrate), such that >50% of the catalyst component resides within the wall, particularly >60% of the catalyst component, preferably >70% of the catalyst component (e.g. >80% of the catalyst component), and more preferably >90% of the catalyst component. When the liquid comprise a plurality of catalyst components, then typically >50% of all of the catalyst components reside within the wall, particularly >60% of all of the catalyst components, preferably >70% of all of the catalyst components (e.g. >80% of all of the catalyst components), and more preferably >90% of all of the catalyst components.

The amount of in-wall and on-wall coating can be determined using scanning electron microscopy (SEM).

EXAMPLES

The invention will now be illustrated by the following non-limiting examples.

Example 1

Manufacture of a Gasoline Particulate Filter (GPF)

A washcoat for a gasoline particulate filter was prepared. The viscosity of the washcoat was modified by adding a rheology modifier to bring the viscosity of the washcoat up to 38 cP (as measured at 20° C. on a Brookfield RV DVII+ Extra Pro viscometer using a SC4-27 spindle at 50 rpm spindle speed). The washcoat was formulated to provide a washcoat loading of 0.8 g in$^{-3}$ and a PGM loading of 25 g ft$^{-3}$. A particle size distribution of the support material that was dispersed in the liquid is shown in Table 1 below.

TABLE 1

| | |
|---|---|
| D(v, 0.1) | 1.44 µm |
| D(v, 0.5) | 5.21 µm |
| D(v, 0.9) | 16.3 µm |
| D(v, 0.98) | 26.52 µm |

Particle size measurements were obtained by Laser Diffraction Particle Size Analysis using a Malvern Mastersizer 2000, which is a volume-based technique (i.e. D(v, 0.1), D(v, 0.5), D(v, 0.9) and D(v, 0.98) may also be referred to as $D_v10$, $D_v50$, $D_v90$ and $D_v98$ respectively (or D10, D50, D90 and D98 respectively) and applies a mathematical Mie theory model to determine a particle size distribution. Diluted washcoat samples were prepared by sonication in distilled water without surfactant for 30 seconds at 35 watts.

The washcoat was used to coat a filter substrate (4.66× 4.5" 0650 NGK™ substrate) to a 50% coating depth using the apparatus shown in FIGURE. A 50% dose volume of the washcoat was dispensed into a containment means located over an upper end face of the filter substrate. A vacuum of −10 kPa was applied to the lower end of the filter substrate 120 seconds after the 50% dose volume was introduced into the containment means.

After drying and calcining the coated filter substrate, it was determined by SEM analysis that substantial in-wall coating of the substrate occurred. The average (mean) coating length of the washcoat was found to be 57% of the axial length of the filter substrate. The distribution of the coating lengths about the average was less than ±10%.

Example 2

Manufacture of a Gasoline Particulate Filter (GPF)

A washcoat for a gasoline particulate filter was prepared having a viscosity of 33 cP (as measured at 20° C. on a Brookfield LV viscometer using spindle SC4-21 at 50 rpm). The washcoat was formulated to provide a washcoat loading of 0.4 g in$^{-3}$.

The washcoat was used to coat a filter substrate (4.66× 4.5" C810 NGK™ substrate) to a targeted 55% coating depth using the apparatus shown in FIGURE. A 55% dose volume of the washcoat was dispensed into a containment means located over an upper end face of the filter substrate. A vacuum of −5 kPa was applied to the lower end of the filter substrate after the 55% dose volume was introduced into the containment means.

The average (mean) coating length of the washcoat was found to be 58% of the axial length of the filter substrate. The distribution of the coating lengths about the average was less than ±10%.

Example 3

Manufacture of a Catalysed Soot Filter (CSF)

A washcoat for a catalysed soot filter was prepared. The viscosity of the washcoat was 49 cP (as measured at 20° C. on a Brookfield RV DVII+ Extra Pro viscometer using a SC4-27 spindle at 50 rpm spindle speed). The washcoat was formulated to provide a washcoat loading of 0.35 g in$^{-3}$ and a PGM loading of 2 g ft$^{-3}$.

The washcoat was used to coat a filter substrate to a 50% coating depth using the apparatus shown in FIGURE without applying a vacuum. A 50% dose volume of the washcoat was dispensed into a containment means located over an upper end face of the filter substrate and was allowed to drain or soak into the channels of the filter substrate.

After drying and calcining the coated filter substrate, it was determined by SEM analysis that on-wall coating of the substrate occurred.

Examples 4 and 5

Manufacture of a Catalysed Soot Filter (CSF)

Two washcoats for a catalysed soot filter were prepared as shown in Table 2 below.

TABLE 2

| Example No. | Viscosity (cP)* | Washcoat loading (g/in$^3$) |
|---|---|---|
| 4 | 5 | 0.245 |
| 5 | 7 | 0.1 |

*measured at 20° C. on a Brookfield LV viscometer using a SC4-21 spindle at 50 rpm The washcoats of Examples 4 and 5 were used to coat a filter substrate (143.8 mm×129.5 mm SD091 Ibiden™ substrate) using the apparatus shown in FIGURE.

For Example 4, the targeted coating depth was 66%. A 66% dose volume of the washcoat was dispensed into a containment means located over an upper end face of the filter substrate. A vacuum of −5 kPa was applied to the lower end of the filter substrate after the 66% dose volume was introduced into the containment means.

The average (mean) coating length of the washcoat was found to be 65% of the axial length of the filter substrate. The distribution of the coating lengths about the average was less than ±10%.

For Example 5, the targeted coating depth was 46%. A 46% dose volume of the washcoat was dispensed into a containment means located over an upper end face of the filter substrate. A vacuum of −5 kPa was applied to the lower end of the filter substrate after the 46% dose volume was introduced into the containment means.

The average (mean) coating length of the washcoat was found to be 48% of the axial length of the filter substrate. The distribution of the coating lengths about the average was less than ±10%.

Example 6

Manufacture of a Catalysed Soot Filter (CSF) Using a Sol

A washcoat using sol type material for a catalysed soot filter was prepared. The viscosity of the washcoat was modified by adding a rheology modifier to bring the viscosity of the washcoat up to 2200 cP (as measured at 20° C. on a Brookfield RVDV-E viscometer using a #4 spindle at 10 rpm spindle speed). The washcoat was prepared using a sol that was formulated to provide a washcoat loading of 0.18 or 0.36 g in$^{-3}$ and a PGM loading of 0.7 g ft$^{-3}$. A particle size distribution of the support material that was dispersed in the liquid is shown in Table 3 below.

TABLE 3

| | |
|---|---|
| D(v, 0.1) | 0.084 μm |
| D(v, 0.5) | 0.122 μm |
| D(v, 0.9) | 0.175 μm |
| D(v, 0.98) | 0.210 μm |

The washcoat was used to coat a filter substrate (5.66×6" 558HG NGK™ substrate) to a 50% coating depth using the apparatus shown in FIGURE. A 50% dose volume of the washcoat was dispensed into a containment means located over an upper end face of the filter substrate.

After drying and calcining the coated filter substrate, it was determined by SEM analysis that substantial in-wall coating of the substrate occurred. The average (mean) coating length of the washcoat was found to be 55% of the axial length of the filter substrate.

Example 7

Manufacture of a Catalysed Soot Filter (CSF) Using a Sol

A washcoat using sol type material was prepared having a viscosity of 810 cP (as measured at 20° C. on a Brookfield RVDV-E viscometer using a #3 spindle at 10 rpm spindle speed). The washcoat was formulated to provide a washcoat loading of 0.193 g in$^{-3}$.

The washcoat was used to coat a filter substrate ((143.8 mm×129.5 mm SD091 Ibiden™ substrate) to a targeted 55% coating depth using the apparatus shown in FIGURE. A 55% dose volume of the washcoat was dispensed into a containment means located over an upper end face of the filter substrate. A vacuum of −20 kPa was applied to the lower end of the filter substrate after the 55% dose volume was introduced into the containment means.

The average (mean) coating length of the washcoat was found to be 54% of the axial length of the filter substrate. The distribution of the coating lengths about the average was less than ±10%.

Examples 8 to 10

Manufacture of a Selective Catalytic Reduction Filter (SCRF™) Catalyst

A series of vanadium containing SCR washcoats were prepared as shown in Table 4 below.

TABLE 4

| Example No. | Viscosity (cP) | Washcoat loading (g/in$^3$) |
| --- | --- | --- |
| 8 | 39* | 1.2 |
| 9 | 104† | 1.6 |
| 10 | 142† | 1.6 |

*measured at 20° C. on a Brookfield LV viscometer using a SC4-21 spindle at 50 rpm;
†measured at 20° C. on a Brookfield LV viscometer using a SC4-27 spindle at 50 rpm The washcoats of Examples 8 to 10 were used to coat a filter substrate as listed in Table 5 below using the apparatus shown in FIGURE. In each case, the targeted coating depth was 75%. Table 5 shows the vacuum that was applied and the coating depth that was obtained for each part.

TABLE 5

| Example No. | Substrate (NGK ™) | Substrate size | Vacuum (kPa) | Mean coating depth obtained (%)‡ |
| --- | --- | --- | --- | --- |
| 8 | C611 | 12" × 10.5" | −25 | 76 |
| 9 | C650 HG-13 | 10.5" × 12" | −42 | 74 |
| 10 | C611 HG | 12" × 12" | −55 | 73 |

‡the distribution of the coating lengths about the average was less than ±10%

For the avoidance of doubt, the entire content of any and all documents cited herein is incorporated by reference into the present application.

We claim:

1. An apparatus for coating a filter substrate with a liquid, which apparatus comprises:
   (i) a containment means for receiving a pre-determined amount of the liquid; and
   (ii) a liquid dosing head arranged to dispense the pre-determined amount of the liquid into the containment means over an upper end of the filter substrate;
   wherein the containment means is locatable at an upper end of the filter substrate, and the liquid dosing head comprises a plurality of apertures for dispensing the liquid onto the upper end of the filter substrate; and
   wherein the containment means comprises a template for covering an area or areas of the upper end face of the filter substrate.

2. The apparatus according to claim 1 further comprising (iii) means for applying a vacuum to a lower end of the filter substrate.

3. The apparatus according to claim 1, wherein the pre-determined amount of the liquid is a pre-determined volume of the liquid.

4. The apparatus according to claim 1, wherein the pre-determined amount of the liquid is a single dose of the liquid.

5. The apparatus according to claim 1, wherein the containment means comprises a sealing means for preventing the liquid from flowing from the upper end face of the filter substrate and onto an exterior side surface of the filter substrate, wherein the sealing means comprises at least one inflatable collar.

6. The apparatus according to claim 1, wherein the filter substrate comprises a plurality of channels, wherein each channel has an open end and a closed end.

7. The apparatus according to claim 2, wherein the pre-determined amount of the liquid is a pre-determined volume of the liquid.

8. The apparatus according to claim 2, wherein the pre-determined amount of the liquid is a single dose of the liquid.

9. The apparatus according to claim 2, wherein the containment means comprises a sealing means for preventing the liquid from flowing from the upper end face of the filter substrate and onto an exterior side surface of the filter substrate, wherein the sealing means comprises at least one inflatable collar.

10. The apparatus according to claim 2, wherein the filter substrate comprises a plurality of channels, wherein each channel has an open end and a closed end.

* * * * *